United States Patent [19]

Briscoe

[11] Patent Number: 4,689,904

[45] Date of Patent: Sep. 1, 1987

[54] RUB LINK ASSEMBLY FOR DRAGLINE BUCKET

[75] Inventor: Terry L. Briscoe, Portland, Oreg.

[73] Assignee: Esco Corporation, Portland, Oreg.

[21] Appl. No.: 912,270

[22] Filed: Sep. 29, 1986

[51] Int. Cl.⁴ .......................... F16G 15/04; E02F 3/46
[52] U.S. Cl. ........................................... 37/135; 59/85;
                                                                  59/93
[58] Field of Search .................. 37/135, 115, 116, 117;
              59/93, 84, 85; 384/49, 50, 549, 548, 52, 56

[56] References Cited

U.S. PATENT DOCUMENTS

| | | | |
|---|---|---|---|
| 1,269,924 | 6/1918 | Gathright | 138/110 X |
| 2,028,598 | 1/1936 | Gibson | 37/135 |
| 2,104,193 | 1/1938 | Gerwig | 59/93 X |
| 3,181,257 | 5/1965 | Larsen | 37/135 |
| 4,131,136 | 12/1978 | Sawyer | 384/563 X |
| 4,411,132 | 10/1983 | Crook, Jr. | 59/85 |
| 4,446,637 | 5/1984 | Ferreira | 37/55 |

FOREIGN PATENT DOCUMENTS 558070  6/1957 Belgium .................................. 59/93

Primary Examiner—Clifford D. Crowder
Attorney, Agent, or Firm—Tilton, Fallon, Lungmus & Chestnut

[57] ABSTRACT

A rub link assembly for replacement of a link or links of the lower hoist chain on a dragline bucket including a rotating collar affixed to a plastic bushing which allows rolling as contrasted to scraping action against the bucket sides.

12 Claims, 6 Drawing Figures

RUB LINK ASSEMBLY FOR DRAGLINE BUCKET

BACKGROUND AND SUMMARY OF INVENTION

This invention relates to a rub link assembly for a dragline bucket and, more particularly, to a link assembly which features a rotatable collar so as to develop a rolling as contrasted to a scraping action as the hoist chain engages the bucket sides.

In the operation of a dragline bucket the hoist chain rubs against the sides of the bucket which can result in increased wear of the lower hoist chain. If this is not caught in time, serious damage could occur.

A previous effort to avoid this difficulty is seen in co-owned U.S. Pat. No. 3,181,257 which featured a twisted chain with increased amounts of metal at points of high wear. This has not proved to be a suitable solution and over the intervening years, operators have had to contend with this problem utilizing conventional chain.

A search of the prior art revealed no material teaching—a representative reference being U.S. Pat. No. 4,411,132 having to do with a special link for use with a windlass.

According to the invention, the rub link assembly replaces a link or links of the lower hoist chain on a dragline bucket and includes a rotating collar affixed to a plastic bushing which allows easy rotation about the central shaft link. When the rub link assembly is scraped along the side of a dragline bucket as it is in each dumping operation, the outer rotating collar spins about the shaft link and the entire assembly rolls along the side of the bucket, instead of scraping. Due to the advantage of rolling friction versus sliding friction, this assembly greatly reduces the wear caused by the chain scraping the side of the bucket—the life of both the chain and the contact area of the bucket is substantially increased. Further, the assembly can be rebuilt and reused in a new chain.

Other objects and advantages of the invention may be seen in the details of the ensuing specification.

The invention is described in conjunction with the accompanying drawing, in which FIG. 1 is a fragmentary perspective view of a dragline bucket equipped with the inventive assembly;

DETAILED DESCRIPTION

Figure 1:
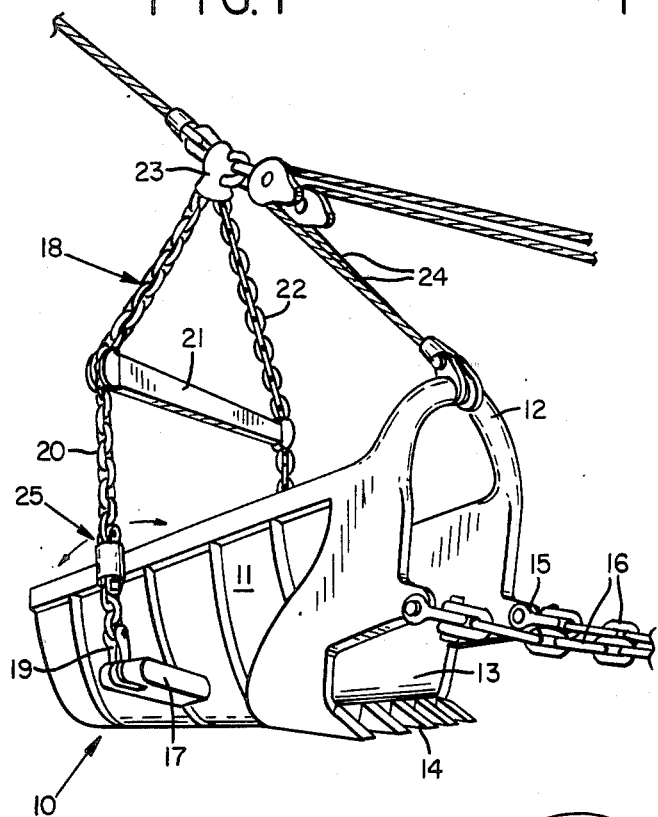

In the illustration given and with reference first to FIG. 1, the numeral 10 designates generally a dragline bucket. For additional details of construction and operation reference can be made to the previously mentioned co-owned U.S. Pat. No. 3,181,257 and the recitations thereof are incorporated herein by express reference.

The bucket 10 has the usual sidewalls 11 connected at the forward end by an arch 12 and connected at the forward bottom to provide a lip 13 from which excavating teeth 14 project.

Still further in conventional fashion, the sidewalls 11 are equipped with shackles 15 to which drag chains 16 are connected. Also, in conventional fashion, the sides 11 of the bucket are equipped with trunnions 17 to which the hoist chains 18 are connected by means of a trunnion link 19. The trunnion links connect the trunnion 17 to the lower hoist chains 20 which are coupled to a spreader bar 21. The upper hoist chains 22 are likewise connected to the spreader bar and are joined at the block 23. Tilting of the bucket is achieved through the cable 24 which again is arranged in conventional fashion.

Figure 2:
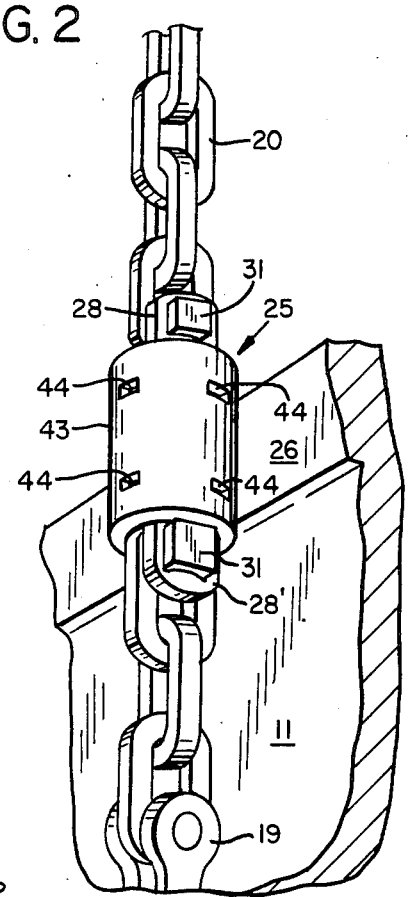
FIG. 2 is an enlarged fragmentary perspective view of the portion of FIG. 1 featuring the inventive assembly.

The inventive rub link assembly is generally designated 25 and can be seen in larger scale in FIG. 2. It is interposed in the lower hoist chain 20 in the position where it would normally rub against the upper bucket side 26. It will be appreciated that during tilting—dumping, for example—the forward end of the bucket is dropped so that the rub link assembly 25 rides along the portion 26 rearwardly and it is this action—in the past—which has caused abrading of both the lower hoist chain links and the bucket. The invention provides a rolling action which substantially reduces the frictional abrasion.

Figure 3:
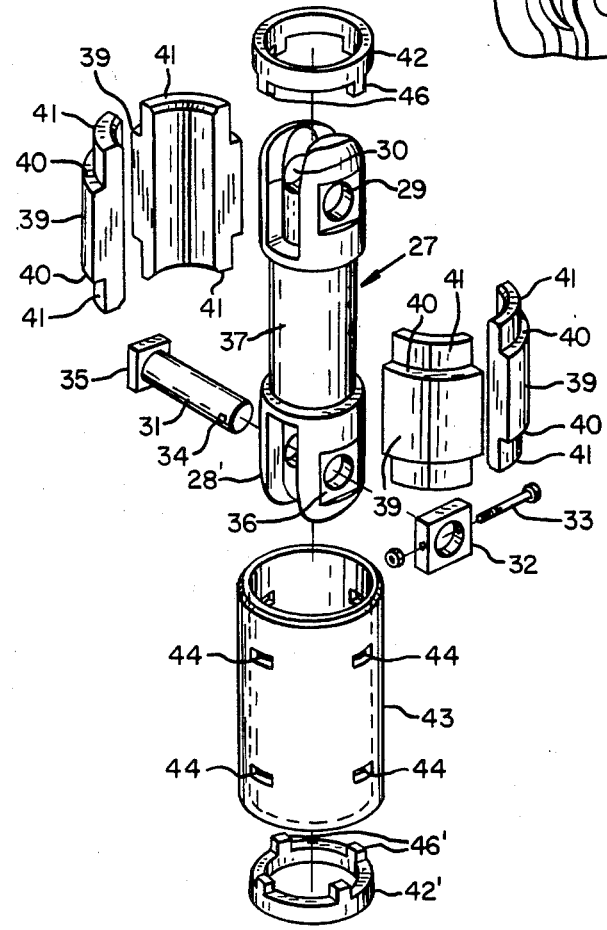
FIG. 3 is an exploded perspective view of the parts of the assembly.

The elements of the rub link assembly 25 can be seen in exploded form in FIG. 3. There the central member or shaft link is generally designated 27 and is seen to be relatively elongated. The member 27 is equipped with clevises 28 and 28' at the ends thereof. The clevises are equipped with aligned openings as at 29 and 30 for the receipt of a pin 31 which serves to connect the associated clevis 28, 28' with the adjacent link of the lower hoist chain 20. The pin 31 is removably fixed in place by means of an apertured nut-like block 32 through which a threaded bolt 33 extends—also extending through a passage 34 at the end of the pin opposite the head 35. Advantageously, the clevis legs may be counter bored as at 36 to accommodate the head 35 and the block 32.

Intermediate the longitudinally spaced apart clevises 28, 28', the shaft link 27 is equipped with a cylindrical constricted portion 37. Mounted against this constricted portion is a bushing which includes a plurality of bushing segments 39.

The bushing segments are stepped at the ends thereof to provide shoulders as at 40 and on the reduced diameter end portions 41, the end rings 42, 42' are mounted.

Figure 4:
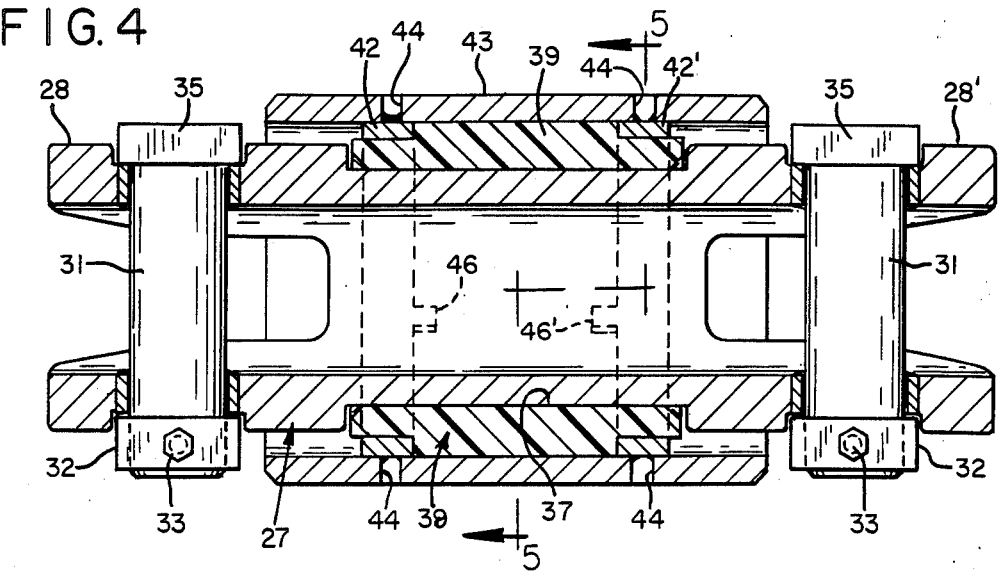
FIG. 4 is a longitudinal sectional view of the assembly.

The shaft link 27, the bushing 38 and the end rings 42, 42' are ensleeved within a rotatable collar 43. The collar 43 is weldably secured to the rings 42 and 42' through the provision of apertures 44. This assembly can be readily appreciated from a consideration of FIG. 4.

Figure 5:
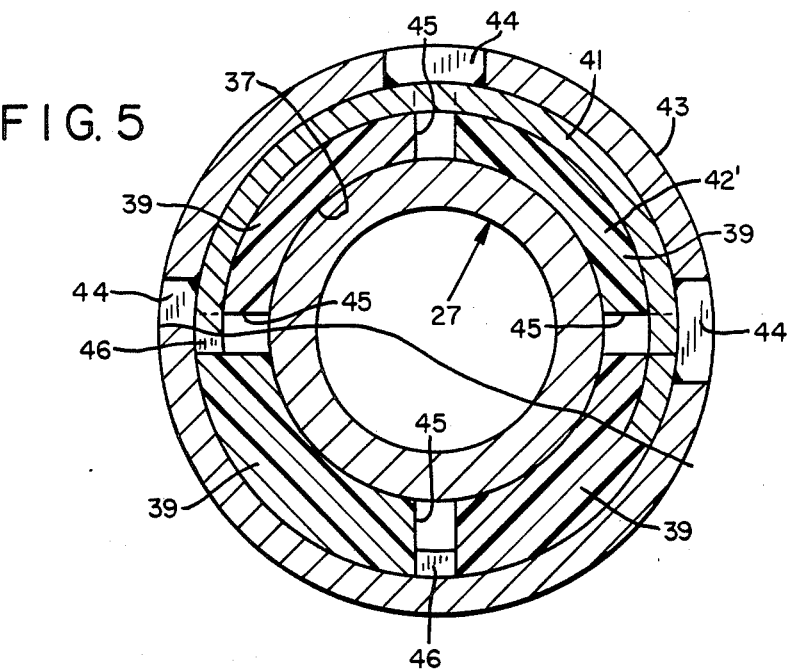
FIG. 5 is a sectional view taken along the stepped sight line 5—5 applied to FIG. 4.

In the illustration given, the segments 39—see FIG. 5 do not occupy the entire annular space between the shaft link 27 and the collar 43—being spaced apart circumferentially by gaps 45 which are of the order of about 1" in width. As an example of the order of magnitude of the equipment, a link assembly 25 for a bucket in the 55 to 70 cubic yard capacity range weighs 700 pounds, is approximately 36" long and has a 14" outer diameter of the collar 43. For a bucket of the 100 cubic yard capacity, the assembly 25 weighs approximately 920 pounds.

The gaps 45 are maintained through the provision of integral lugs 46, 46' on the rings 42, 42', respectively. The lugs 46, 46' are positioned between the adjacent segments 39 so as to maintain the spacing. This provides the advantageous operation of providing an exit passageway for material which otherwise might adhere to the shaft link 27 and build up so as to prevent the desired rotation of the collar 43 and the bushing 38. It will be appreciated that the collar 43 and the rings 42, 42' constitute a rigidly or fixedly connected sub-assembly which is keyed to the bushing segments 39.

Figure 6:
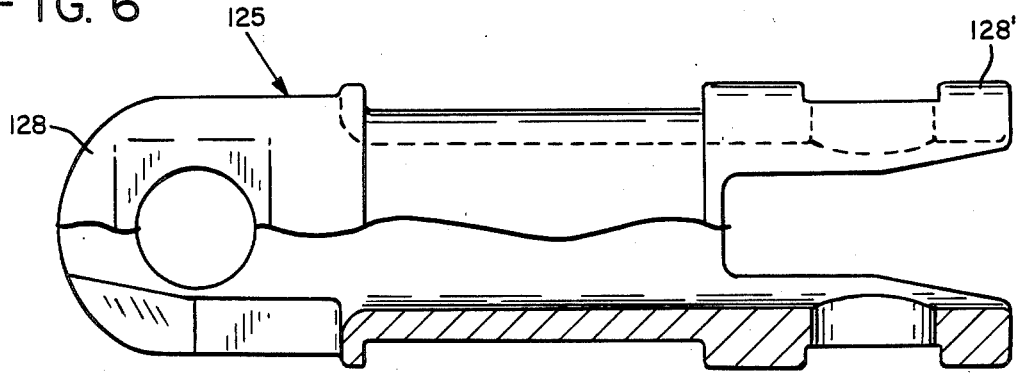
FIG. 6 is a side elevational view, partially in section of a modified form of shaft link—as would be employed where the assembly replaces two links and therefore the clevis-like ends are offset 90° relative to each other.

A modified form of shaft link generally designated 125 is seen in FIG. 6. Again, it is equipped with end clevises as at 128 and 128' and differs only from the embodiment of FIGS. 1-5 in that the clevises are disposed at 90° to each other rather than being co-planar. This is advantageous when, for example, two links are removed from the lower hoist chain 20.

While in the foregoing specification, a detailed description of the invention has been set down for the purpose of explanation, many variations in the details hereingiven may be made by those skilled in the art without departing from the spirit and scope of the invention.

We claim:

1. A rub link assembly for a dragline bucket adapted to be interconnected in a hoist chain for rolling movement against the bucket side comprising a relatively elongated member having a clevis at each end, each clevis being equipped with aligned openings adapted to receive bolt means for removably connecting said clevis to the hoist chain links, said member being further equipped with a cylindrical collar journaled thereon between said clevises and providing a rolling bearing against the bucket side.

2. The assembly of claim 1 in which said member is constricted between said clevises to provide a cylindrical surface, and a bushing interposed between said surface and said collar.

3. The assembly of claim 2 in which said bushing is longitudinally split to provide a plurality of bushing segments.

4. The assembly of claim 2 in which said member and collar are constructed of metal and said bushing is constructed of plastic.

5. A rub link assembly for a dragline bucket comprising a relatively elongated shaft link having a clevis at each end, each clevis being equipped with aligned openings adapted to receive bolt means, said shaft link being constricted between said clevises, a plurality of bushing segments mounted against said cylindrical surface, and collar means connected to said bushing segments for rotation on said cylindrical surface.

6. The assembly of claim 5 in which a ring encircles said bushing segments at each segment end, said rings being fixed to said collar.

7. The assembly of claim 6 in which said rings are equipped with integral lugs to maintain said cylindrical segments in circumferentially spaced relation.

8. A dragline bucket comprising a body having upstanding side, rear and bottom walls with said sidewalls being equipped with trunnions, a hoist chain for each trunnion, a rub link assembly in each hoist chain, said rub link assembly including an elongated shaft interconnected in each of said hoist chains, and a collar rotatably mounted on said shaft for rolling engagement with said bucket sidewalls.

9. The bucket of claim 8 in which said sidewalls are equipped with a wear surface adjacent the upper bucket edge, said rub link assemblies being aligned with said wear surface.

10. The bucket of claim 8 in which said shaft is equipped with a clevis at each end for interconnection into said hoist chain.

11. The bucket of claim 10 in which said clevises are substantially co-planar.

12. The bucket of claim 10 in which said clevises are disposed at about 90° relative to each other.

* * * * *